United States Patent [19]

Lemelson

[11] 3,818,500

[45] June 18, 1974

[54] CARD TRANSDUCING APPARATUS & METHOD

[76] Inventor: Jerome H. Lemelson, 85 Rector St., Metuchen, N.J. 08840

[22] Filed: Aug. 2, 1972

[21] Appl. No.: 277,401

Related U.S. Application Data

[60] Continuation-in-part of Ser. No. 83,239, Oct. 22, 1970, abandoned, which is a continuation of Ser. No. 807,877, March 17, 1969, abandoned, which is a continuation-in-part of Ser. No. 417,386, Dec. 10, 1964, Pat. No. 3,434,130, which is a continuation-in-part of Ser. No. 142,748, Aug. 28, 1961, Pat. No. 3,646,258, which is a division of Ser. No. 515,417, June 14, 1955, Pat. No. 3,003,109.

[52] U.S. Cl................. 360/2, 235/61.11 D, 360/60, 360/78

[51] Int. Cl....... G11b 5/80, G11b 5/54, G11b 21/12

[58] Field of Search........ 179/100.2 CA, 100.2 MD, 179/100.2 R; 340/174.1 F, 174.1 C, 174.1 R, 149 A; 35/35 C; 235/61.11 D

[56] References Cited

UNITED STATES PATENTS

| | | | |
|---|---|---|---|
| 2,254,931 | 9/1941 | Bryce | 340/174.1 C |
| 2,722,676 | 11/1955 | Begun | 340/174.1 R |
| 2,849,542 | 8/1958 | MacChesney | 179/100.2 R |
| 2,910,669 | 10/1959 | Brand | 340/174.1 R |
| 2,918,656 | 12/1959 | Nolde et al. | 340/174.1 C |
| 3,292,171 | 12/1966 | Wilson | 340/174.1 R |
| 3,488,867 | 1/1970 | Lyon et al. | 35/35 C |

*Primary Examiner*—James W. Moffitt
*Assistant Examiner*—Alfred H. Eddleman

[57] ABSTRACT

An apparatus and method are provided for transducing signals with respect to record cards, first by recording signals representing document information on selected tracks of a record card and thereafter by selectively reproducing the signal information recorded on selected tracks of the cards. In a preferred form, the information record is in the form of full frame video picture signals capable of generating still monitorable images on the screen of a cathode ray tube. The signals are so generated and recording is selectively controlled and effected that a full frame vodeo picture signal occupies a single track of a plurality of such tracks extending parallel to each other along most of the length of the card.

A single transducing unit is provided capable of recording full frame video signals on selected tracks of a card and of coding the tracks. The unit contains a mount for magnetic heads which mount is movable in a plurality of directions to bring the heads into alignment with a selected card track and then to move the information signal transducing head parallel to and along the selected track to effect transducing relative thereto.

An automatic control system is provided permitting recording on selected tracks of a card including automatic recording on the first unrecorded track appearing to a magnetic recording head as it moves or the first unrecorded track of a selected group of a plurality of track groups.

12 Claims, 13 Drawing Figures

CARD TRANSDUCING APPARATUS & METHOD

RELATED APPLICATIONS

This is a continuation-in-part of application Ser. No. 83,239 filed Oct. 22, 1970, now abandoned, which was a continuation of Ser. No. 807,877 filed Mar. 17, 1969, also abandoned, which is a continuation-in-part of application Ser. No. 417,386 filed Dec. 10, 1964, now U.S. Pat. No. 3,434,130 for *Card Scanning Apparatus.* The latter is a continuation-in-part of Ser. No. 142,748 filed Aug. 28, 1961, now U.S. Pat. No. 3,646,258 as a division of Ser. No. 515,417 filed June 14, 1955 now patent 3,003,109.

SUMMARY OF THE INVENTION

This invention relates to an apparatus and method for recording information signals on record cards and the like and for selectively reproducing such information from selected portions of selected cards. In particular, the invention is concerned with magnetically recording and reproducing document signals which may be utilized to generate still image displays of the original document.

It is known in the art to store and retrieve recordings of documents and the like by utilizing microfilm as the recording medium and, in certain instances, attaching one or more frames of microfilm recordings of documents to a record card. So called photographic or microfilm systems have many shortcomings which impose limitations on their use and applications. For example, the application of microfilm to cards such as aperture cards requires manual or machine operations to either seal the microfilm to the card or properly dispose it in a jacket attached to or forming part of the card. Such microfilm recordings may not be easilty updated or added to, replaced or otherwise altered without physically changing or replacing a frame or an entire strip or matrix array of frames. The alteration of information previously provided on exposed photographic film is virtually impractical due to the photofinishing process required to develope and fix the image in the film.

The instant invention employs electronically recorded information signals, preferably in the form of full frame video picture signals containing either the picture elements or a combination of the picture elements, synchronizing, blanking and equalizing signals which are generated on the output of a television camera during a full frame sweep of its read-beam. Such full frame composite video picture signals may be utilized to generate still images of pictures or documents by properly applying them to intensity modulate and deflection control the write-beam of a image producing cathode ray tube. Since they are magnetic recordings of still image phenomena, they may be rapidly and easily recorded without chemical processing and may be erased and replaced by electronic means with other such signals such as video signals of other documents or updated versions of the same documents scanned to generate the signals so recorded. By employing special apparatus and control techniques as defined herein, magnetic record cards of the type provided may be employed as part of a document information storage and retrieval system having a capacity of storing millions of frames of document signals, any one of which is automatically retrievable in a matter of seconds and may be electronically scanned to monitor recorded information or to record new document information.

The instant invention employs cards containing plural parallel record tracks on each of which may be recorded code and marker signals to identify or locate the track and a full frame video picture signal along substantially most of the track. In a preferred form of the invention, the magnetic recording or reproduction transducer is moved first in one direction to bring it into alignment with a selected track of the card and is thereafter moved along the selected track in such a manner as to permit it to record on or reproduce from such selected track during a full scanning sweep of the selected track.

Accordingly it is a primary object of this invention to provide a new and improved card recording and reproduciton apparatus and method for selectively recording signals on and reproducing signals from selected areas or tracks of a card.

Another object is to provide an improved apparatus and method for automatically and selecteively recording document image signals on parallel tracks of a record member such as a card in a manner such that each signal may be easily reproduced from the card and utilized to generate a still image representative of its content.

Another object is to provide a control system for controlling operation of a card recorder in such a manner as to permit the automatic recording of information on the first record area or track of a card which is sensed as not containing information recorded thereon.

Another object is to provide a control system for controling operation of a card recorder in such a manner as to effect the automatic recording of information of the first unrecorded track of a selected group of tracks defined on the card or other sheet docuemnt.

Another object is to provide a new and improved mechanism for conveying and positioning a magnetic transducer with respect to a sheet magnetic recording member such as a record card.

Another object is to provide a magnetic recording device employing means for moving a transducer and record member in a plurality of directions and for automatically retracting said transducer during its movement in a particular direction so as to reduce wear thereon and prevent wear along a portion of the record member.

Another object is to provide an improved transport mechanism for a magnetic transducer permitting it to be driven in two directions and predeterminately positioned at selected locations of a sheet record member.

Another object is to provide a magnetic recording apparatus and method for selectively recording and reproducing information by scanning a record member in one direction with a first magnetic transducer supported on a common mount with a second magnetic transducer which is employed to scan in a direction other than that scanned by the first transducer, wherein means are provided for selectively engaging the transducers with the record member to reduce wear.

Another object is to provide a magnetic card document storage system employing a card reader to selectively scan magnetic recordings on record cards by relative movement between a flux sensitive transducer and manetic recordings on a card wherein certain variations in said relative movement may be tolerated.

Another object is to provide an information storage and reproduciton system employing magnetic cards containing recordings of image signals and a common synchronization signal which may be used to control recording and to improve and simplify the recording operation.

Another object is to provide an improved method for recording full frame video picture signals on a record member by using signals recorded on the record member to drive an image signal generator to effect synchronization between relative movement of the record member and a recording transducer.

Another object is to provide a magnetic card recording apparatus having code tracks and information signal tracks and separate selective means for reproducing and recording signals with respect to any of such tracks.

Another object is to provide a magnetic card recording and reproduction system which may be utilized for a variety of record keeping pupproses.

With the above and such other objects in view as may hereinafter more fully appear, the invention consists of the novel constructions, combinations and arrangements of parts as will hereinafter be more fully described and illustrated in the accompanying drawings, but it is to be understood that changes, variations and modifications may be restored to which fall within the scope of the invention as claimed.

Figures 1, 2, 3, 4, 5, 6, 7, 8, 9:
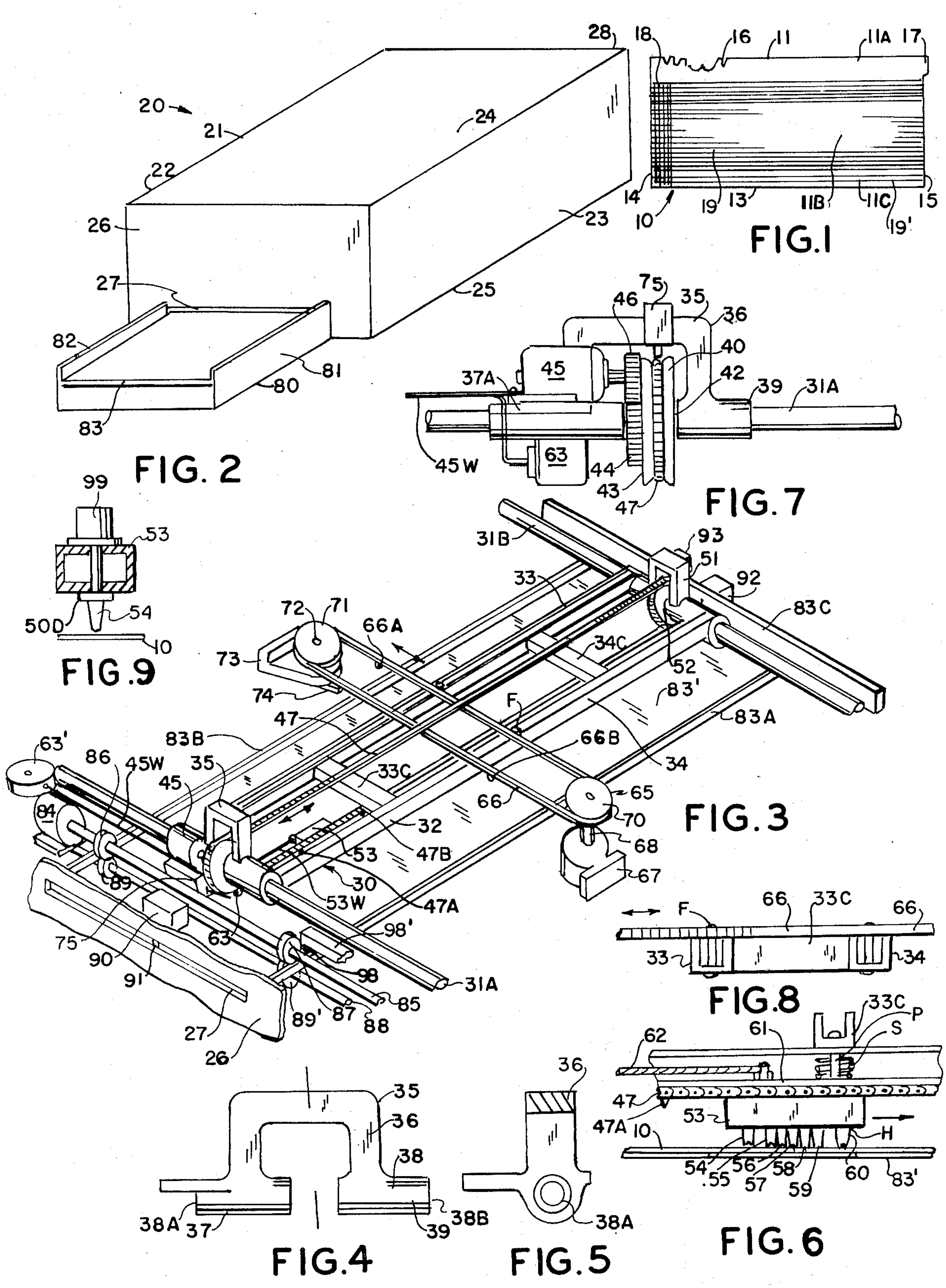
FIG. 1 is a plan view of a magnetic record card which may be employed with the apparatus of this invention.
FIG. 2 is an isometric view of a recording and/or reproduction unit applicable to receive and transduce with respect to record cards of the type shown in FIG. 1.
FIG. 3 is an isometric view of mechanism disposed within the housing shown in FIG. 1.
FIG. 4 is a side view of one of the components of FIG. 3.
FIG. 5 is an end view with a portion broken away for clarity of the component shown in FIG. 4.
FIG. 6 is a side view of a magnetic transducer mount employed in the apparatus shown in FIG. 3.
FIG. 7 is an end view of another part of the assembly shown in FIG. 3.
FIG. 8 is an end view of a portion of the assembly of FIG. 3 showing certain components thereof.
FIG. 9 is an end view in cross section of a transducer and mount forming part of the mechanism of FIG. 3.
Figures 12, 13:
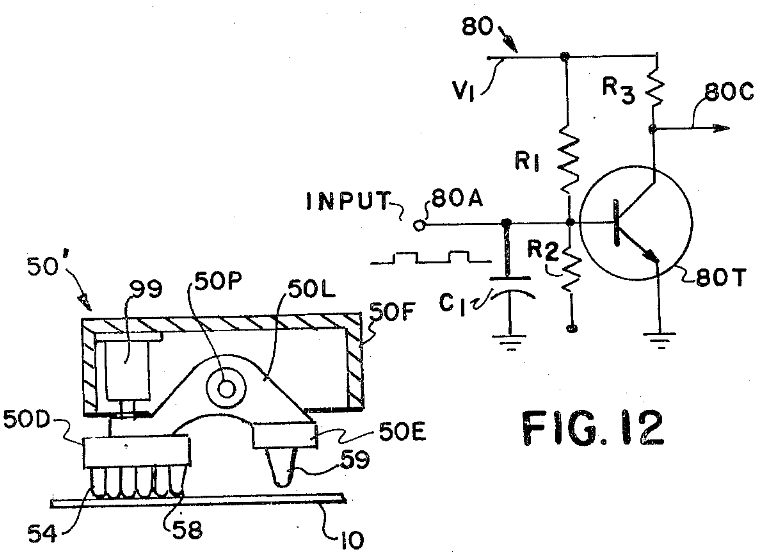
FIG. 12 is a circuit diagram of one of the blocks shown in FIG. 11.

FIG. 13 in a side view with parts broken away for clarity of the head mount of FIG. 3 modified so as to permit certain heads thereof to engage the card while other heads are out of track engagement.

In FIG. 1 is shown details of a magnetic record card 10 which serves as the storage medium utilized in the apparatus defined in the remaining drawings. The card 10 may be made of metal, plastic or paperboard sheet containing or having coated on at least one surface thereof a magnetic recording material such as chromium dioxide, barium ferrite or the like. The card 10 is rectangular in shape, has a straight leading edge 15 at one end thereof and a trailing edge 14. One longitudinal edge 13 is straight while the other 16 is scalloped and contains notchings 16' defining a coded shape which is used in card retrieving operations which do not form part of this invention. A strip portion 11C of the card along edge 13 contains magnetic recording material and one or more tracks 19' extending longitudinally therealong on which digital information may be recorded.

The major and central portion 11B of the record card 10 contains magnetic recording material and defines a plurality of first record tracks 19 extending parallel to the length or longitudinal direction of the card with the tracks spaced apart from each other such that they may be easily recorded on and the recordings thereon read by one or more transducers of a recorder-reader apparatus as hereafter described. Recorded on an end-portion of each track of tracks 19 (e.g., adjacent the lateral edge 14 of the card) are a series codes C such as binary digital codes each representing a number which define the track location and/or information recorded therealong. Such codes occupy an area denoted 11D and the bits forming part of recordings of each code are recorded along respective lateral line or track areas 18 which extend parallel to each other. The tracks 18 may be scanned and read by a bank of magnetic pick-up heads while the heads are driven in a direction transverse to the longitudinal direction so as to position a transducer adapted to scan tracks 19 in alignment with a selected of said tracks 19 for magnetically recording signals on the selected track or reproducing information already recorded along the selected track. Notation 17 refers to a metal tab secured to the end of the card which may be used in card retrieval operations while notation 11A refers to the border portion of card 10 adjacent longitudinal edge 16. Magnetic recording material may or may not be disposed along border portion 11A.

The portions of tracks 19 other than the leading parts thereof which occupy area 11B may contain either or both analog and digital signal recorded magnetically thereon. In a preferred form, each of tracks 19 have recorded along their lengths a full frame composite video picture signal containing all the necessary elements such as picture signal, horizontal and vertical sync signals, blanking and equalizing signals necessary for intensity modulating and deflection controlling the picture generating electron beam of a cathode ray tube to generate a still image such as the image of a document on the viewing screen of the tube one or more of the tracks 18 may contain marker signals recordings each of which defines the location of a respective of the information signal tracks 19.

In FIG. 13 is shown further details of the mount 50 for the code and video transducers wherein means are provided for urging either the code heads 54–58 or the video head 59 into engagement with the surface of the card in the control modes described. Head mounts 50D and 50E, which respectively support the code-heads 54–58 and the video transducer 59, are shown as supported at the ends of an L shaped arm 50L which is pivotally mounted on a pin 50P supported by the walls of the housing 50F. The bistable solenoid 99 is supported within housing 50 and has its actuator connected to the end of arm 50L which is secured to mount 50D. When the actuator of solenoid 99 is extended it urges heads 54–58 against the surface of the card while lifting the end of head 59 off the surface of the card as shown. When said actuator is retracted, it pivots arm 50L clockwise causing head 59 to engage the surface of the card 10 and disengaging heads 54–58 from the card surface.

Spring or flexible plastic biasing material may be disposed beneath the card 10 or between arm 50L and the head mounts 50D and 50E to spring bias both towards the card so that the respective heads will be spring biased against the card when they are respectively engaging the surface of the card.

Certain assumptions are made with respect to the schematic electrical system and sub-system diagrams provided herein which have been simplified in order to improve the drawings and render them more easily understandable to those skilled in the art. For example, for many of the circuits and components, sources of electrical energy have been eliminated from the drawings and it is therefore assumed that the correct power supply in provided on the correct sides of all switches, relays, motors, motor controls, solenoids, transducers, video monitors, video cameras, amplifiers and other components as well as sub-system circuits. Where necessary, it is assumed that suitable amplifiers are provided in circuits such as those containing recording and reproduction heads. Where circuit junctions are provided branching from one to a plurality of circuits, transformers such as pulse transformers may be utilized if not called for or shown. Where a plurality of circuits connect to a single line, suitable junction means or OR circuit means may be utilized to assure that the signals generated on any of the incoming lines will be properly transmitted to the single circuit. Diodes or the like are assumed to be provided in circuits requiring same to assure that signals or power are directed along the proper circuits as described.

Where magnetic transducing is employed to selectively magnetically record pulse or video signals onto magnetic record cards and to reproduce previously recorded information from selected tracks of a record member such as a card, such functions are described and provided in the drawings as being effected by respective single transducer heads which may be operated in either the recording or reproduction modes depending on how their field coils are electrically energized. Electric motors employed to drive the card and transducers have their forward, stop and revers drive controls, denoted by notations F,S and R and being pulse activated although they may be controlled by gating electrical electrical energy directly to their forward and reverse inputs.

In addition to providing suitable amplifiers in the transducer circuits to properly amplify, if necessary, the signals to be recorded or reproduced from recordings thereof, two heads or transducers may replace each or one or more of the single transducers, one to provide for magnetic recording and the other to provide for magnetic reproduction of signal recordings from the cards. Such two head recording and reproduction arrangement may be provided to effect the described functions by placing the video signal recording and reproduction heads immediately adjacent each other in the direction of video scanning (e.g., alinged with or in the direction of the record tracks 19). Conversely, the code signal transducers would be adjacent each other but aligned and in the direction normal to the direction of tracks 19 (e.g., in the direction of the tracks denoted 18). Each of said heads may be operated in the manners defined herein to perform either the recording or reproduction functions when energized as described, to record or reproduce either or both the code and video signals or to reproduce either or both from selected tracks of a card.

While delay lines are specified in the drawings to introduce time delays in the circuits in which they are used for properly performing the control functions described, it is understood that suitable semi-conductor circuits or other suitable electrical means for performing the same function may also be employed such as so called time delay relay circuits.

There is shown in FIGS. 2 to 7 a card reading apparatus 20 having card reading and prepositioning means disposed within a housing 21 of box like configuration having rigid side walls 22, 23; top and bottom walls 24, 25 and walls 26 and 28. An elongated slot-like opening 27 is provided in end wall 26 through which a card of the type shown in FIG. 1 may be pushed or driven from a platform or conveyor 80. Once inserted into opening 27, the leading edge of the card deflects the actuator 91 of a limit switch 90 disposed behind the opening, which switch closes and starts a reversible gear motor 84 which drives a shaft 85 containing wheels 86 and 87 spaced to engage longitudinal border portions of the card against respective wheels 89 and 89′ supported to rotate freely on a shaft 88 extending between the side walls of the housing. Additional drive and idler wheel pairs may be disposed along the path of travel of the card in housing 21, with the drive wheels being belt or chain driven by motor 84. The card is guided along the upper surface of a plate 83 forming part of the platofrm 80 and having side walls 81 and 82 which project above the plate 83 to laterally align and position the card entering the opening 27. When the card reaches the far end of housing 21, a second limit switch 92 is actuated by the card's leading edge 15 and operates to stop motor 84 positioning the card beneath a transducer assembly and transport mechanism 30 shown in greater detail in FIGS. 2 to 5.

The mechanism 30 is composed of a pair of parallel rods 31A and 31B which are supported at their ends by the side walls 22 and 23 near the end walls of housing 21. The rods support a rigid assembly 32 of elements supported by a frame composed of spaced apart parallel longitudinal structured channels 33 and 34 which are each secured at their ends to tubular leg portions of respective U-shaped frame members denoted 35 and 51 and are supported along their lengths by cross bars 33C and 34C.

The frame 35 is shown in detail in FIG. 4 and 5 and is composed of a U-shaped member 36, the legs of which contain respective elongated tubular formations 37 and 39 secured to or forming part of said legs. Cylindrical bore 38A and 38B through the formations 37 and 39 are axially aligned with each other and preferably contain low friction linings or lineal bearings 38A′ to permit sliding movement of the frame 35 along the rod 31A. A sprocket wheel 40 has a bored hub 42 having width a few thousandths of an inch less than the gap between formations 37 and 39 of frame 35 permitting said wheel to be disposed on rod 31A and rotate thereon between formations 37 and 39 yet be moved axially along the rod when the frame 35 and its assembly is moved laterally across the housing.

Formed in one face 43 of sprocket wheel 40 or secured thereto is a spur gear 44 for rotating said wheel when engaged by a spur gear 46 secured to the shaft of a reversible gear motor 45 which is mounted on an extension 37A of the tubular formations 37 of U-frame member 35. An endless belt or drive chain 47 extends partly around and engages the teeth of sprocket wheel 40 and is held taut between frame channels 33 and 34 by a second sprocket wheel 52 which is rotatably and slidably supported on rod 31B near the other end of the housing 21 between a U-shaped frame member 51 which is similar in construction to frame 36 and is also slidably supported on said rod 31B. Thus the assembly 32 may be moved as a unit laterally across the housing on the rods 31A and 31B.

Secured to the lower portion of chain 47 is a support 53 for a plurality of longitudinally aligned magnetic heads 54 to 60. The support 53 and heads are shown in greater detail in FIG. 6 wherein the support is a box-like member having a plurality of longitudinally aligned through holes H in each of which is secured the base of a respective magnetic transducer head. The support 53 may be engaged by a spring loaded plate 61 which is spring mounted on pins P secured to the cross bars 33C and 34C. The plate 61 is biased downwardly by coil spring S disposed therebetween and the cross bars 33C and 34C so that the heads are biased downwardly against the card. A cable 62 contains wire pairs extending from all of the magnetic heads mounted on support 53 and extends through the channel member 34 to a spring wound wire coiling device 63 of conventional design, supported by frame member 36 and employed to keep the cable 62 taut. The cable 62 extends along the tubular formation 37A and is tied to the wires 45W for motor 45 which extend to a second spring wound wire coiling device 63' supported by the side wall of the housing.

The assembly 32 is driven back and forth across housing 21 by an endless loop of belt or chain 66 forming part of an assembly 65 which includes sprocket wheels 70 and 71 supported respectively adjacent opposite side walls of the housing 21 by the shaft 68 of a reversible constant speed gear motor 67 and a shaft 72 supported by a pillow block 73. The motor 67 and pillow block 73 are respectively fastened to the side walls 22 and 23 so as to dispose the loop of chain 66 between the loop of chain 47 just above the structural channel members 33 and 34. One leg of the loop of chain 66 is secured to at least one of said structural members with a fastener F as shown in FIG. 8 permitting the chain 66 to drive the assembly 32 across housing 21 on rods 31A and 31B as the chain 66 is driven by gear motor 67. Thus if a card 10 is suitably aligned and located within housing 21, suitable control of motor 67 may be employed to position the assembly 32 so that the magnetic transducers 54 to 60 are in longitudinal alignment with a selected record track of the card after which the heads may be longitudinally driven to transduce signals with respect to said selected track by proper operation of motor 45.

A first limit switch 74 supported on pillow block 73 has its actuator arm disposed to be deflected by a pin 66A secured to chain 66 for defining the maximum degree the assembly 32 may be driven across the housing and stopping or reversing motor 67 to return assembly 32 to a home location as determined by a second pin 66B located on chain 66 to deflect the arm of limit switch 74 in the direction opposite to the direction it is deflected by pin 66A to effect the stopping of motor 67 with said assembly at said home location which may be adjacent one side of the housing 21. A second limit switch 75 mounted above or on a leg of U-frame 35 has its actuator arm located to be engaged by a first pin 47A mounted on the chain or belt 47 to stop the motor 45 with the head mount 53 positioning the heads 54 to 59 to read the parallel codes extending across the front end of the card for locating the record tracks thereof and the heads. A third limit switch 93 supported by frame 51 has its actuator arm located to become deflected and actuate the switch by a second pin 47B on chain 47 when head mount 53 is at the end of its scanning sweep of the selected information track and is wired to reverse motor 45 to cause the head mount 53 to return to home as determined when pin 47A strikes switch 75.

The described chain drives for the head mount and the laterally movable assembly 30 may be replaced belt drives, by rack and pinion drives or by lineal actuators of sufficient stroke to carry their assemblies the distances required. While automatic positioning control is required of the assembly 30 to position the video recording head 59 thereof in alignment with a selected track of the recording tracks 19 requiring a controllable motor or actuator which may be stopped or braked within a given degree of precision, the motor or actuator used to move the head mount 53 longitudinally is preferably operated in a single stroke wherein constant speed drive of the head mount is rapidly attained so that the full frame video picture signal is properly recorded and initiated shortly after longitudinal driving movement of the head mount had been initiated.

In FIG. 3 notation 98' refers to a mount for a magnetic transducer 98 or a group of heads operable to record bit signals along one or more border tracks 19' of the card and/or to reproduce such signals therefrom as the card is driven longitudinally into or through the housing as described. The mount 98' is supported by the side wall 23 of the housing and the head or heads supported thereby may be spring biased against the card or brought into engagement with the upper recording surface of the card by means of a solenoid as illustrated in FIG. 9 which shows a solenoid 99 mounted on the support 53 for the movable heads 54 to 58 which is selectively operated to cause engagement or either the code heads or the video head with the card depending on which direction the heads are in motion and which are employed in transducing at the time the solenoid is activated. Further details of this mode of operation are described hereafter.

If a magnetic head is employed for reproducing the video picture signals from the card, in which their output is independent of motion, then irregularities which may be experienced in driving the video pick-up transducer 59 along the selected track of the card may be tolerated particularly if the full frame composite video picture signals so reproduced and generated by said head contains all the synchronizing signal elements for deflection controlling and driving the write-beam of the storage cathod ray tube or television display. Use of a Hall Effect magnetic reproduction transducer of the type manufactured by the Pioneer Electric Company of Japan which employs cross-shaped semi-conductor pole pieces to generate a differential voltage or Hall voltage which is independent of motion of the magnetic recording medium will permit reproduction of the recorded video picture signals during the acceleration and deceleration stages of the video transducer.

Figure 10:
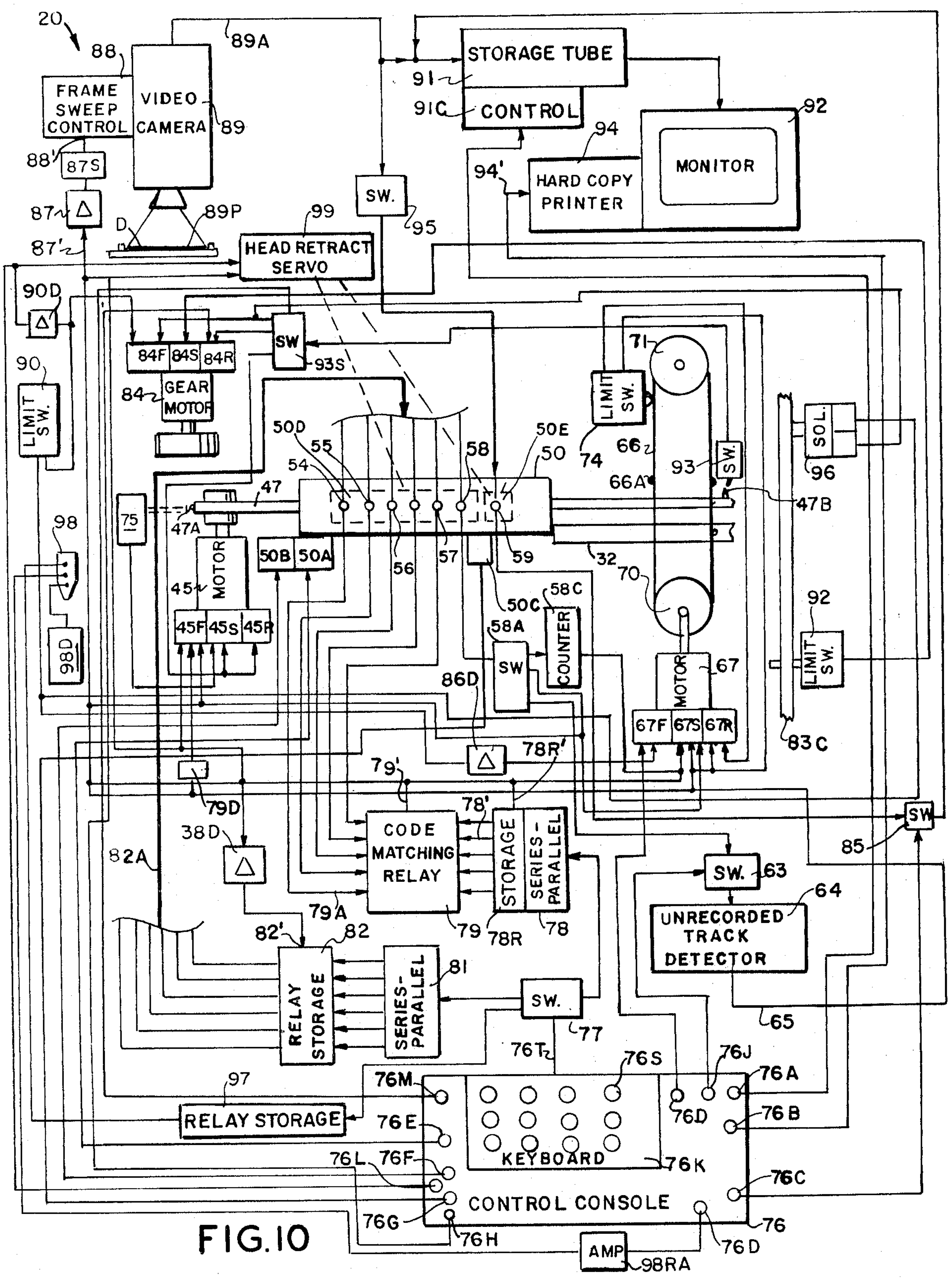
FIG. 10 is a schematic diagram of the electrical components and sub-systems forming part of the control system applicable for controlling the apparatus of FIGS. 2 – 9 in either the recording or reproduction modes.

FIG. 10 shows a system for magnetically recording and reproducing document information utilizing the card recorder-reader unit 20 detailed in FIGS. 1 to 8. The information recorded is in the form of full frame video picture signals derived from the output of a television camera 89 having its deflection control driving circuits 88 modified as set forth in U.S. Pat. No. 3,051,777 to effect a full frame read-beam scanning of its image field when an input 88' thereof is energized or pulses so as to generate on its output 89A, a composite picture signal at either slow scan or conventional scanning rate which signal is applied to a signal repeater such as a video storage tube 91 which feeds and retains a still image on the screen of a television receiver 92.

The magnetic transducers are mounted on a belt or chain driven support 50 and include a bank of code recording and reproducing heads denoted 54 to 57, a marker signal recording and reproducing head 58 and a video signal recording and reproducing head 59. All of the heads are in alignment with each other in the direction in which the belt or chain 47 is driven so that the code heads may simultaneously scan parallel bit codes on each track and the marker pickup head may scan a marker signal on the same track which the video signal transducer scans.

A control console 76 is provided at the monitor station which utilizes the reader recorder unit 20 and includes manually operable switches 76A to 76M for performing functions to be described. The magnetic code transducers 54 to 58 are operable in either the recording or reproduction modes depending on how their coils are energized. Control input 50A when energized, conditions all the code heads and video head 59 to operate in the reproduction made. Control input 50B conditions both the code heads 54 to 57 and the video head 59 to record. Control input 50C, when energized, conditions just the code signal transducers 54–58 to reproduce codes. The heads may thus be respectively conditioned in either the recording or the reproduction modes by connecting power to respective recording or reproduction amplifiers for said heads when console switches 76E, 76F and 76G are closed.

RECORDING OPERATION

Assuming that a card is driven into housing 21, is laterally aligned therein by side guide bars 83A and 83B and is longitudinally prepositioned therein when its leading edge 15 is disposed against end bar 83C, and it is required to record full-frame video picture signal on the first track of the card 10 approached by the bank of heads conveyed from a home location situated adjacent the longitudinal edge 13 of a card, such operation may be initiated by pre-recording a track marker signal in alignment with said first track to be scanned by the marker pickup circuit of head 58. Console switch 76G is closed conditioning heads 54–58 to first reproduce codes during their lateral movement across the card. Console switch 76F is also closed to permit the heads 54–58 to record a new code when the selected track is reached and to permit head 59 to record a video signal along the selected track.

Upon inserting the card 10 into the housing 21, the leading edge thereof actuates limit switch 90 which generates and passes a control signal to the start control 84F of motor 84 which drives the card through the housing until its leading edge abuts the projected stop bar 83 and motor 84 is stopped by a pulse generated by limit switch 92 at the far end of the housing when it senses the card leadway edge. The signal is transmitted from switch 92 to stop control 84F of motor 84. When lateral movement of the mount 50 is effected thereafter, the first marker signal reproduced by marker pickup head 58 is passed thru a multiple pole switch 58C which is conditioned from the console 76 to pass said signal to the stop control 67S of motor 67 so as to stop the assembly 30 with the video head 59 aligned with said first track. A reproduction of the same marker signal is passed to the start control 45F of motor 45 which initiates driving the belt or chain 47 to cause head 59 to be conveyed above and along the first track to permit recording thereon. A further reproduction of the same marker signal is passed through a delay line 87 to the input 88 of the read-beam deflection and driving circuits 88 of video camera 89 such that the full frame composite video picture signal is initiated on the output of 89A of the camera and passed to video recording head 59 at a predetermined time after movement of the video recording head has initiated such that it has been accelerated to substantially a constant recording speed. The entire full frame video picture signal of the document D or other phenomenon scanned by the camera 89 is generated and magnetically recorded on the first track of the card by the time the head 59 has been transported to the end of the track so that substantially the entire length of the card is utilized for recording purposes.

When mount 50 is driven to near the end of its travel near pulley wheel 52, limit switch 93 is actuated upon engagement by the pin 47B on chain 47 therewith and pulses the stop and reverse controls 45S and 45R of motor 45, causing the heads to be returned to the front end of the housing on their transport. A console mounted switch 76H may then be actuated to energize the reverse drive control 84R of motor 84 driving the card 10 backwardly to the platform 83 or the forward drive control 84F of motor 84 may be activated from the console to drive the card out. A manually operable multiple pole switch 93S in the lines extending from limit switch 93 and the controls for motor 84, is controlled by signals from a console operated switch 76H and is employed to determine if the card is to be driven backwardly through the housing to platform 83 or to a conveyor or platform. The card may also be held for further transducing. The switch 93S may be operated from the control console or by a switch 76M or signal generating device such as a computor, so that it will not pass signals from the limit switch 93 to the start controls for motor 84 permitting a card to remain prepositioned within the housing so that the transducers may be stopped to the next track or to any other track of said card and operated thereafter in the act of either recording new video and code signals or reproducing previously recorded signals from selected tracks of the card.

In order to reduce wear on the heads and magnetic recording material of the cards, the code and marker signal transducing heads 54 to 58 are preferably supported on a common mount 50D which is movable with respect to the mount 50 and may be projected by a servo device 99 such as a solenoid as shown in FIG. 9 to engage the heads against surface of a card which is prepositioned in the housing 21 or to retract said heads by either the selective operation of said servo device or by spring means biasing said mount 50D to retain the heads off the surface of the card when not recording signals thereon or reproducing signals therefrom. The servo 99, which is denoted as a head retract servo, may comprise a push-pull solenoid and is shown as having a first input from the line 87' extending to the video camera trigger input 88' to retract the solenoid to remove heads 54–58 from the card just before the mount 50 is moved parallel to tracks 19. A second input from limit switch 90 is also activated by a signal from switch 90 or a signal generated by closing a console switch 76L operates servo 99 to advance said heads against the card prior to the next transducing cycle to permit them to reproduce code and marker signals.

Video signal transducer 59 is shown mounted on a support 50E which is movable on mount 50 by solenoid 99 to engage the card when heads 54 to 58 are retracted from the surface of the card after said head becomes aligned with the selected track of the card just prior to the operation of motor 45 in driving belt 47 to effect a scanning operation of the selected track by said head. It is noted that the signals fed to transducer 59 may be generated by means other than the video camera 89 and may also comprise digital information signals.

RECORDING ON NEXT TRACK

Assuming that a transducing operation has just been completed on one track of the card and that the switch 93S is in an open condition so that the output of the limit switch 93 is not passed to operate the controls of card driving motor 84 so that the card remains prepositioned in the housing 21 while the mount 50 returns to its home position near the wall 26 of the housing 21, then the track next to that which was just recorded on may be next scanned either in the recording or reproducion mode as follows. A switch 58A is provided in the output of track marker pick-up 58 for connecting said output either to the input of a pulse counter 58C or a second switch 63 which will be described. The counter 58C is a presettable, predetermining counter capable of being set to generate a control pulse on its output after one or a selected number of pulses are passed to its input. If the counter 58C is preset to generate a pulse upon receipt of one input pulse, and head 58 reproduces a marker signal after motor 67 has started and said marker signal is generated from a marker pulse recording positioned to locate the track of the card next to the one just recorded on or reproduced from, then the counter generated pulse may be applied to stop motor 67 so as to align the head 59 with the next track of car. The output of counter 58C is thus passed directly to the stop control 67S of motor 67 so as to stop said motor after it has been started by pulsing the start control 67F of said motor. The motor may be started by manually closing a switch 76K on the control console or generating a signal on control 67F as the output of a computer or programming device. In a particular mode of operation, if motor 67 is a stepping motor it may be operable to drive belt 66 to step head 59 from one track to the next each time a pulse is received by the activating input to said motor and pulses may be derived from the output of pick-up 58 which is passed both to the counter 58C and said stepping motor. When counter 58C uncounts, it may be operable to open a switch preventing passage of any more pulses from head 58 to the stepping motor input thereby effecting stoppage of motor 67 wherein the heads are aligned with a selected track of the card. In other words counter 58C may be used to control the positioning of the head mount so as to effect the recording or reproduction of signals along any track of the card located beyond the stopped position of mount 50 depending on how many pulses said counter is present to uncount with and generate a control signal.

RECORDING ON NEXT UNRECORDED TRACK

If it is desired to stop the frame 32 so that the video signal head 59 is in alignment with the first track of the card on which no signal is recorded, a detection circuit 64 is provided for detecting the presence or arrival of said first unrecorded card track and may be introduced into the control system by the closure of a bistable switch 63 operation of a switch 76J on the control console. Logical circuit 64 is shown in detail in FIG. 11. Output 65 thereof is connected to activate both the stop control 67S of motor 67 for terminating the driving of mount 50 with the head 59 aligned with the first unrecorded track of the card, and the start control 45F for motor 45. Output 65 is also connected for activating the television camera trigger input 88' at the proper instant after the motor 45 has begun to drive the video head 59 at constant speed along the unrecorded track with which it is so aligned. Such control is effected by passing the signal output of detector 64 to a delay line 87 after a switch 87S has been closed from the control console wherein the duration of the delay imposed by 87 is such as to permit motor 45 to start and attain constant speed driven of the head mount 50. Assuming that motor control 67F has been activated to start motor 67 to drive chain 66 to move mount 50 across the card so that lateral scanning commences and the marker pulse pickup head 58 is energized to reproduce the pulses for tracks containing video signal recordings, such pulses are intermittently fed to a pulse resettable timer 80 which, if so pulsed at a frequency equivalent to the time it takes to move the head 58 laterally the distance between marker recordings located at the beginning of each track which contains a recorded video picture signal, a signal will continue to be generated on the output 80' of timer 80. This signal is fed to retain a normally closed monostable switch 90S open. The input to switch 90S is derived from the card edge detector limit switch 90 which is closed while the card remains in the reader-recorder housing. The signal generated by detector switch 90 is delayed by delay line 90D before being applied to the input of switch 90S to permit the motor 67 to drive the card a sufficient distance laterally for the head 58 to pick up the first marker pulse so that the signal generated by detector switch 90 will not pass through switch 90S until head 58 fails to detect a marker pulse recording following that marker pulse recording located on the last track of tracks 19 containing a video signal recording. When head 58 fails to generate marker signals beyond the time interval defined to reset the timer 80, said timer will fail to generate a signal on its output and normally closed switch 90S will close, allowing electrical energy from the card detector switch 90 to pass to its output 90' which extends to the stop control 67S of motor 67 and the start control 45F of motor 45 such that the card and heads are positioned with the heads in alignment with the next unrecorded track and the head 59 may scan the next track as the mount 50 for the heads is driven by motor 45 to cause scanning of the next unrecorded track of tracks 19 by head 59. The output of switch 90S also extends to a pulse generator 64P such as a one shot multivibrator or over-ride pulse generating switch which is connected to the recording circuit of record-reproduce head 58 and effects recording of a marker pulse on the track with which it is aligned which is thereafter recorded on with a full frame video picture signal as described.

Details of a timing circuit which may be employed to control switch 90S to pass the signal from limit switch 90 on its output 90′ as described, are shown in FIG. 12. The circuit 80 employs a transistor 80T to maintain a signal on an output 80C as long as pulses of a given duration and frequency are applied to input 80A thereto. Capacitance C1 is chosen such that it will not discharge a degree between receipt of marker pulse signals to cause the transistor 80T to conduct input voltage $V_1$ to ground rather than to output 80C until no pulse is received on the input within the time interval necessary to attain such condition. Thus when the magnetic pick-up head 58 fails to detect and generate a marker pulse recording at a track location after the last marker signal was reproduced, output 80C becomes deactivated allowing normally closed monostable switch 90S to close and to pass the signal generated by the limit switch 90 to pass therethrough to activate the stop control 67S of motor 67, the start control of motor 45 and the pulse generator 64P for the purposes described.

FIG. 13 shows a modified mount 50′ for the transducers having the code transducers 54–58 secured to a support 50D which is on the end of an L shaped arm 50L which is supported to pivot by the walls of the mount housing 50F. Solenoid 99 either urges heads 54–58 or head 59 into engagement with the card as described.

In certain card information storage and retrieval operations it may be desirable to record a new video signal onto the first unrecorded video record track of a selected group of tracks of a card, which group may be one of a plurality of such groups. For example, if the card record area 11B contains one-hundred of the record tracks 19, these may be divided into a plurality of different groups of adjacent tracks for recording different types of information such as 10 groups of 10 tracks each or a larger or smaller number of groups of tracks containing the same or different numbers of tracks each. If the operator knows the number of groups and the numbers of tracks for each group, (e.g., 10 groups of 10 tracks each) he may control the relative positioning of the card and transducer mount with respect to a particular group by providing a marker signal recording on one of the lateral tracks 18 of each group such as the first track appearing in the group which recordings are predeterminately located with respect to each group. He may control recording of a selected video signal on the first unrecorded track of a selected group by reproducing such group marker signals with a pick-up which is supported on the transducer mount as lateral scanning and relative head and card movement is effected and by applying the reproduced marker signals to a counter operable to count out and generate a control signal when the pick-up approaches or is aligned with the selected group of longitudinal tracks. Thereafter, the described unrecorded track detection circuit 64 may be activated to detect the first unrecorded track of the group. Such a control arrangement may be effected by providing a switch 64SW between the power supply PS and the card edge detector 90 which switch may be manually closed to permit detection of the first unrecorded track of a card as described, or manually opened but conditioned to permit it to be closed by a solenoid 64SD which is connected to be activated by a signal from a counter 64C. Counter 64C is operable to count pulse signals generated by a magnetic pickup 58A scanning the lateral track containing the group marker signal recordings and operable upon uncounting to generate a control signal which is passed to pulse solenoid 64SD to cause its actuator to engage the manually opened arm of switch 64SW and cause its contact to engage the stationery contact of switch 64SW closing said switch.

Figure 11:
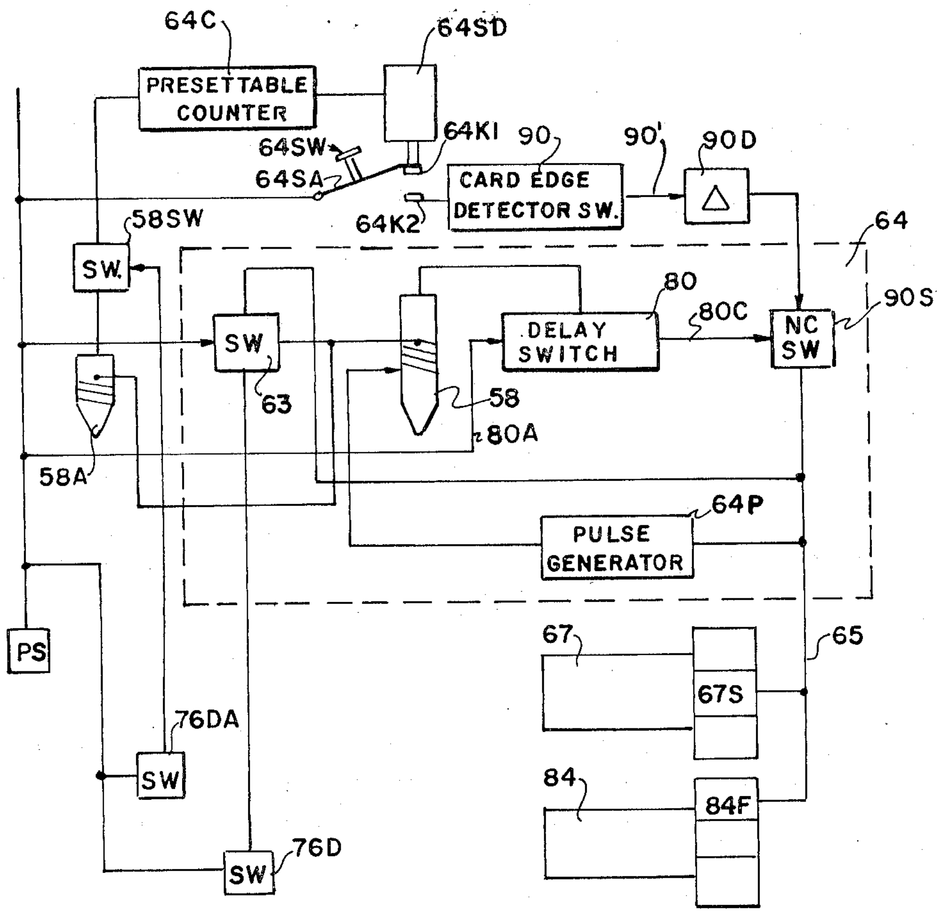
FIG. 11 is a circuit diagram of one of the subsystems of FIG. 10.

The switch 64SW is shown in detail in FIG. 11, and is composed of a first contact 64KI supported by a pivoted arm 64P which is both manually pivotable to urge the contact into and out of engagement with a second contact 64K2 of the switch. A solenoid 64SD is disposed with its monostable actuator arm 64SA normally retracted and advancable against the pivoted open arm 64SA to cause it to close its contact against the other contact of the switch when a pulse is received by the solenoid 64SD from counter 64C. A bistable switch 58SW is provided between head 58A and counter 64C which may be closed from the console when it is desired to effect an information or video signal recording on the first unrecorded track of a selected group of tracks as determined by presetting of the counter 64C.

Closure and opening of the described switches and presetting of the counter 64C may be effected by manual means and/or signals generated by a computer.

Notation 25A refers to a console mounted switch for connecting power from power supply PS or an amplifier connected thereto to energize head 58A in the reproduction mode when it is desired to detect a particular group of tracks of a card by generating group marker signals when head 58A scans its record tracks.

RECORDING ON A CODED TRACK

If it is desired to record a signal such as a full frame video picture signal of a document, on a track of the card which is defined by a previously recorded binary code signal recorded in parallel along lateral tracks 18 and in series on the selected longitudinal track 19 or to record such a video signal on the next track adjacent the track containing said binary code, the following procedure is effected. The track selection code is generated by selectively operating the keys 76S of code generating keyboard 76K and is passed, as generated, to keyboard output 76T. Switch 77 is manually or otherwise conditioned to pass said series code to a series-to-parallel converter 78 and the code is held in parallel on the outputs 78′ thereof which extend to a code matching relay 79 which is constructed in accordance with the teachings of U.S. Pat. No. 3,539,715. The start control 67F of motor 67 is then activated a delay interval after limit switch 90 is actuated by the leading edge of the record card inserted into the housing. The delay, determined by delay line 86D in the circuit, is such as to permit the card to be driven through the housing against a stop 83C to longitudinally preposition the card such that the code tracks 18 thereof will be aligned with the code magnetic heads 54 to 57 which are conditioned for magnetically reproducing the code signals by energizing the input 50A, a function which is effected from the control console 76 by closure of switch 76E connecting the magnetic field sensing coils of the heads to a suitable amplifier and power supply. As the heads are driven laterally across the card, they sense the track code recordings near edge 14 of the card and pass the signals generated on parallel circuits 79A to the comparison inputs of code matching relay 79. When the code generated on circuits 79A matches the input code applied to circuits 78', a control signal is generated on the output 79' of relay 79 and is passed to activate the stop control 67S of motor 67 which causes lateral movement of frame 32 to cease with the head 59 aligned with the selected track of the card. Thereafter, a reproduction of the signal generated on output 79' is passed thru a delay line 79D to the forward drive control 45F of motor 45 driving chain 47 and the head mount to move and drive head 59 thereon in scanning movement along the selected track. A further reproduction of the same control signal is passed thru delay line 87 to the trigger input 88' of video camera control 88 to effect the generation of the full frame video signal of a document D placed in the scanning field of the television camera on a prepositioning support or conveyor 89P for said document. The duration of delay line or timer 87 is such that scanning of the document by the read beam of video camera 89 and the video signal generated thereby will be initiated when motor 45 has accelerated movement of mount 50 to substantially constant speed. Since such acceleration may be effected within the frame blanking interval of the full frame video signal during which no beam modulating signal is generated, if the circuits of control 88 are operable to control the read-beam to slow scan its image field, the delay line 87 may be eliminated.

RECORDING OF CODES

While frame or track locating code signals may be prerecorded on each track of the card before video signals are recorded on the card, for many applications it may be desirable to record track identifying codes just prior to recording a video signal on the same track or the track preceding the track in which the video signal which said code identified. Such code recording may be recorded by generating the code in series by sequentially depressing keys 76S, passing the series code on output 76T through properly conditioned switch 77 to series-to-parallel converter 81 and passing the parallel code to a relay storage bank 82 in which it is held until read out on parallel outputs 82A to the heads 54 to 58 and recorded thereby on tracks 18 in alignment or otherwise predeterminately located with respect to the selected record tracks 19. Read out of the code stored in unit 82 is effected by passing a reproduction of the pulse developed on output 79' thru a suitable delay line 38D to the read-out input 82' of parallel code storage unit 82. The code so generated is passed to the recording circuits of heads 54 to 57 as said heads pass the location of the card on which said code is to be recorded which location is such, that reproduction of the code during a future scanning operation may be used to properly stop and laterally position the head support 50 at a location such that when it moves longitudinally thereafter as the chain 47 is driven by 45, head 59 will scan the track which is defined by said code. In this connection it is noted that heads 55 to 57 may either be aligned and offset from head 59 to permit them to record their code while the head mount 50 is still in lateral movement just prior to coming to rest or each code associated with a particular record track may be recorded along the track adjacent thereto wherein the lateral drive motor 67 will be braked, after receiving a pulse from relay 79, in the time it takes for the frame 32 to travel between adjacent tracks. If motor 67 is a stepping motor, delay relay 38D may be of such duration to cause the parallel code stored in relay storage banks 82 to be read out and passed to code recording heads 54 – 58 while said stepping motor is operating to advance the heads.

REPRODUCING OPERATIONS

Most of the control circuit elements described for controlling movement of the card and head mount 50 in the act of recording video signals onto selected magnetic recording tracks of the record card 10, are employed in the reproduction mode with the exception that certain switches are operated either manually or by signals generated by a computer, to properly energize the transducer head 59 for reproducing recorded video signals.

In conditioning the circuitry for reproducing video signals, the switch 95 is opened. If it is desired to reproduce a full frame video picture signal from a track of a card by binary code signal selection, the keys 76S of keyboard 76K are manually activated to generate said binary code on the output 76T and the code is passed thru switch 77 to the series-to-parallel converter 78 and held on the outputs 78' thereof extending to code matching relay 79 until a code generated on inputs 79A thereto match the keyboard switch generated code, whereupon the described control signal is generated on output 79' and is applied to stop control 67S stopping motor 67 and the movement of frame 32 with head 59 aligned with the track of the card containing the selected video signal recording. Thereafter the signal generated on output 79' is passed thru delay line 79D to start control 45F for motor 45 driving belt 47 and causing mount 50 to carry video head 59 to scan the selected track and reproduce its video recording, which reproduced video signal is passed thru a bistable switch 85, properly operated by operation of a console switch 76C, to the input to the storage tube 91 which periodically generates video signals for modulating the video monitor 92 to generate a still image on its viewing screen of the document information represented by the full frame video signal so reproduced.

If it is desired to reproduce a full frame video signal recorded on the track next to the track with which head 59 is aligned, marker signal output switch 58A is adjusted to connect its input to counter 58C and the counter is adjusted to generate an output signal upon receiving a single marker pulse which output signal is applied to stop control 67S, stopping motor 67 with head 59 aligned with the next track of the card. Counter 58C is thus preferably manually presettable from console 76. If the system is computer controllable, counter 58C may also be presetable by pulse or code signals generated by said computer.

If it is desired to make a print of the image generated on the screen of monitor 93, a hard copy printer 94 is provided and its control input 94' is energizable to effect printing of a single copy of said image by closure of a switch 76B located on console 76. Switch 76A of console 76 connects to the control 91 for storage tube 90 and is operable to effect erasure of the image information recorded in the storage tube, a function which may automatically be effected when a new video signal is recorded therein.

While only five code heads are illustrated for reproducing and recording lateral track locating codes, a larger number may be employed depending on how many bits are desired to make up the largest number of the characters employed to classify and code all of the tracks of all cards to be employed in the system. It is also noted that each card of the system may contain a code such as a binary code recorded along one or more of the tracks 19' of area 11C while the longitudinal tracks 19 may merely be identified by respective bit marker pulse signals recorded in lateral alignment along a lateral track near the leading or trailing edge of the card or along both edges to permit a presettable counter to be employed to attain location of the head 59 with a selected track by reproducing such marker signals as the head is driven laterally across the card and generating a control signal for stopping the lateral drive motor when a predetermined number of such signals have been received by the counter. This will eliminate the need to provide the described code matching relays and the bank of pick-up heads used to reproduce parallel codes and simplify both the transducing arrangement and the control system.

Other modes of operation of the described apparatus are noted. For example, the described means for detecting the first unrecorded track approached by the video head in its travel across the card may be varied. In one such mode, the marker recording head 58 is energized for sufficient time during its travel across the card so as to provide a pulse recording of sufficient length to extend such recording from the previous pulse recording to the next track of the card. Thus a substantially continuous signal will be recorded laterally across the card by the multiple recordings effected by head 58 which signal will terminate at the far border of the last track on which a video recording is effected. Such continuous signal may be reproduced when head 58 is operated in the reproduction mode or by another head on mount 50 and the resulting continuous output signal may be applied directly to the switching input of normally closed switch 90S to retain it open as described. When such signal fails to be reproduced as the head 38 begins to scan across the first unrecorded track, the monostable switch 90S will open allowing the electrical power passed through limit switch 90 to pass to the output of 90S to the pulse generator 64P which generates a pulse of sufficient duration to extend the continuous recordings on the lateral track scanned by head 58 one more track width beyond the end of said recording. The pulse is also transmitted to the controls 67 and 84 for effecting control of motors 67 and 84 as described.

In another mode of control, the output of pulse generator 64P may be applied to erase a previously recorded pulse disposed along the first unrecorded track prior to effecting video signal recordings on the card. In other words, marker signals are first recorded along the entire track scanned by the head 58 for locating each of the longitudinal tracks 19 and each is automatically erased as a new video recording is made on its track. Then the first marker signal reproduced by the pick-up circuit of head 58 will be that from a pulse recording which is aligned with the first track which does not contain a video recording and may be applied directly to a pulse transformer feeding circuits 64P, 67S and 84F.

Other forms of the invention and modifications to the described apparatus are noted as follows:

1. The described automatic control system for selectively driving the transducer head assembly laterally across the card to attain its alignment with a selected track of the card by employing feedback signals to control a motor may be replaced by manually effecting positioning of the transducer mount prior to causing it to scan the selected track of the card whereby the apparatus is substantially simplified. This may be effected by printing marks along a lateral edge of a card to identify the lateral locations of tracks of the card. Alphanumeric characters may also be imprinted to identify the printed marks or groups of such marks. A simple mechanism is then employed to either manually position the card on a platen with a selected mark thereof aligned with a pointer which is predeterminately positioned with respect to the video signal transducer to permit the transducer to be driven thereafter along the selected track for either recording thereon or reproducing therefrom. Thereafter the transducer mount is driven by a constant speed motor as described to cause it to properly scan the selected track. The card may be clamped to or otherwise held against the platen in alignment thereon whereafter the platen is manually slidably pushed along runners or is so driven by a manually turned screw drive until the selected track mark is aligned with the pointer. Thereafter the clamping means is manually or automatically released when a pushbutton is actuated which starts the motor driving the card longitudinally as described to cause the card to be driven past the video transducing head.

2. In another form of the invention, the card and transducer are selectively positioned as described above and the transducer mount is manually moved so as to cause the video transducer to sweep and scan the selected track of the card. Although the movement of the transducer may not be at constant speed, during the reproduction of a recorded composite video picture signal, the vertical and horizontal sync signal components thereof will be produced in their entirety in synchronized relation to the picture signal and may be applied to generate a still image on a viewing screen after the signal has been applied to a video storage tube. In the recording mode, horizontal and vertical synchronizing signals for a full frame recording of video picture information may be prerecorded along a longitudinal track of the card and reproduced by an auxilliary video pick-up head as the card or heads are driven longitudinally and the resulting sync signals applied to drive the read beam of the video camera scanning the document image to be recorded on the selected card track. Thus synchronization between the camera generated video picture signal and the movement of the card is effected and both recording and reproduction of the composite full frame video signals with respected to selected tracks of the card may be effected without the need to motor drive the heads past the card or the card past the heads.

3. By employing separate magnetic recording and reproducing heads which are aligned with each other on the head mount described in the direction parallel to the record tracks 19 when a card is predeterminately located on the magnetic card readerrecorder unit, certain problems associated with effecting suitable alignment of the video signal magnetic reproduction head may be minimized. For example, if such a magnetic recording head is wider in configuration that the reproduction head and is operable to record a full frame video picture signal as described which is of substantially greater width than the width of the operating end of the reproduction head therefore, then certain variations may be tolerated in the positioning of the magnetic video signal reproduction transducer with respect to the selected track of the card. In other words, if the video signal is recorded on a track and the recording has a width greater than the width of the reproduction transducer or video pick-up, the entire video signal may be reproduced even though the video pick-up is not exactly centered along the selected record track. The width of the magnetic recording head or gap thereof (e.g., width of the space between pole pieces in the lateral direction, not the gap spacing per se) is preferably in the range of 1½ to 5 times the width of the pole pieces of the magnetic reproduction head. Certain minor variations in longitudinal alignment of the card may also be tolerated if the full frame video picture signal recording is wider than the magnetic pick-up used to reproduce such signal.

The card reading-recording apparatus and system described may also be computer controlled in its operation wherein cards are stacked and automatically fed to the reader-recorder housing to be either selectively recorded on and/or reproduced from as described. Signals generated by a computer may be applied to open and close the described switches and generate selection and recording codes on the circuits provided by means of a programming device or computer which is also operative to generate video signals, digital information which can be converted to video signals or which may be generated in select groups each or groups of which may be selectively recorded along respective selected tracks of a card as described. The computer or programmer may also be operable to to control a feeding device for documents which places individual documents to be stored as full frame picture signals thereof, in the scanning field of the described television camera wherein means are also provided for removing the documents from the scanning field of the camera and stacking or conveying same away from the camera after scanning has been effected as described.

A computer may also be utilized to scan selected tracks of selected cards containing information, such as full frame video picture signals of selected documents or digital information which is required to be monitored or otherwise utilized. Such signals may be fed to a computer to be analyzed, digitized or otherwise utilized or may be recorded on a magnetic tape, disc or drum of a magnetic recorder for later use when called on. The computer may also be used to effect reproduction of selected full frame video picture signals which are applied as they are generated upon reading selected tracks of cards, to the described cathode ray tube and utilized to generate hard copy by automatically operating the hard copy printer described each time an image is generated on the image generating screen of the video receiver or by effecting such operation in response to signals generated by the same computer controlling operation of the card reader. The same computer may also be used to control the selection of cards from storage.

I claim:

1. An apparatus for transducing information relative to record cards and the like comprising in combination:

a support, first means for prepositioning a record card on said support which card contains a plurality of parallel record tracks which extend in a first direction, means movably supported on said support for transducing information with respect to selected record tracks of a record card, second means supported by said support for guiding and driving said transducing means in a second direction along a path which is normal to said first direction wherein said transducing means is moved adjacent to and across a record card which is prepositioned by said first means, first control means for controlling operation of said second means to stop the driving movement of said transducing means when said transducing means is aligned with a selected track of a card, third means for driving said transducing means in a path which is parallel to said first direction, second control means operable when said transducing means is in alignment with a selected track of a card for controlling operation of said third means to initiate driving movement of said transducing means from its stopped position at which it is aligned with said selected track to move said transducing means in said second direction so as to cause said transducing means to scan the selected track of the card with which it is aligned and to travel to the end of the selected track, and means for controlling operation of said third means to return said transducing means to the position at which it was located prior to the initiation of its scanning movement along the selected track.

2. An apparatus in accordance with claim 1 wherein said first means includes a movable stop for engaging one end of a card and means for aligning a card against said stop, means for moving said stop out of the way of a card to allow it to pass said stop, and means for controlling operation of said stop moving means to permit movement of a card past said stop, and means for activating said card stop control means and means for driving a card past said stop after a transducing operation has been completed.

3. An apparatus in accordance with claim 1 wherein said transducing means is operable to engage and move along a surface of a card during the transducing operation and said first means includes means for retentively engaging a card prepositioned by said first means to prevent it from being moved during the transducing operation.

4. An apparatus in accordance with claim 1 wherein each of said cards contains scannable means for locating the individual record tracks of each card and said means for controlling operation of said second means includes means supported to move with said transducing means for scanning said track locating means and for generating feedback signals as said transducing means is driven by said second means in said second direction across a record card and said scanning means senses said track locating means, and presettable means for receiving said feedback signals and generating a control signal when the feedback signals received thereby define that the transducing means is aligned with a selected track of a card in accordance with the presetting of said presettable means.

5. An apparatus in accordance with claim 4 wherein said scannable locating means comprise a plurality of marker signals aligned across said card and including at least one marker signal recorded aligned with each track of the card for identifying same and said scanning means is located and moved when said transducing means is driven in said second direction along a path to permit said scanning means to scan said recorded marker signals and to generate said feedback signals.

6. An apparatus in accordance with claim 1 wherein said transducing means includes means for magnetically recording record signals, said first means comprises a support for said second and third means, said support including means for predeterminately supporting and presenting a magnetic record card in a flat condition to said transducing means, means for generating information signals, control means for controlling said signal generating means to generate selected information signals, means for generating a control signal when said magnetic recording means is aligned with a selected track of a card, means for receiving said control signal and responding thereto to stop the driving of said transducing means with the magnetic recording means thereof aligned with a selected track of a card, further means responsive to the received control signal for initiating operation of said third means to drive said magnetic recording means along the selected card track to permit signal transducing with respect to said selected track and means for activating said control means for said signal generating means after initiating operation of said third means to generate a selected information signal, said information signal generating means being operatively connected to said magnetic recording means whereby the information signal generated thereby will be recorded on the selected track of the card as it is scanned by said magnetic recording means.

7. An apparatus in accordance with claim 6 wherein said third means includes a first flexible belt-like member, means for securing said transducing means to said first belt-like member, reversable motor means connected to drive said belt-like member and means for guiding said transducing means as it is driven by said belt-like member in a path parallel to said first direction and in engagement with the surface of said magnetic record member, a support for said first belt-like member, means for guiding said first belt-like member support in said second direction, said second means includes a second flexible belt-like member, means for securing said second belt-like member to said support for said first belt-like member, means for supporting and guiding said second belt-like member in said first direction across said first means, a second reversable motor means connected to drive said second belt-like member and thereby move said support for said first belt-like member in said second direction, said means for generating said control signal being connected to terminate the operation of said second motor and initiate the operation of said first motor when said magnetic recording means is aligned with a selected track of the card.

8. An apparatus in accordance with claim 7 wherein said second motor is a stepping motor operable to move said magnetic recording means across a record card from track-to-track thereof past a different record rack as said second motor is pulsed by an electrical signal, and means for generating a chain of pulses to step said support for said magnetic recording means in said second direction.

9. In an apparatus for selectively recording and reproducing signals relative to selected parallel tracks of multiple track flat record cards comprising:

a support, recording and reproduction transducing means supported by said support, means for prepositioning a record card on said support, first means for effecting relative movement in a first direction parallel to the parallel tracks of a record card supported by said support, second means for effecting relative movement in a second direction of said transducing means and a record card supported by said support wherein said recording transducing means may be brought into alignment with a selected track of said parallel tracks and may be moved thereafter by said first means in scanning said selected track, means for generating information signals to be recorded on said record member by said transducing means, said information signal generating means being connected to transmit the information signals it generates to said recording transducing means, control means for said signal generating means operable to cause it to generate a selected information signal, first control means for controlling operation of said first means to position said recording transducing means in alignment with any selected track of a card prepositioned on said support, second control means for controlling operation of said second means to position said recording transducing means in alignment with a first track of a card approached by said transducing means on which first track there is no recording and means operable upon alignment of said recording transducing means with a selected track of a card for activating said first control means to effect scanning of the selected track by said recording transducing means and for activating said control means for said signal generating means to cause a selected information signal to be generated and to be transmitted to said recording transducing means while movement is effected in said first direction whereby said information is recorded along said selected track of said card.

10. An apparatus in accordance with claim 9 wherein said first control means and said control means for said signal generating means are connected to a common control circuit, and means for generating a control signal on said common circuit to deactivate said second means to position said transducing means aligned with said selected track, and delay means connected to receive said control signal for activating said control means for said information signal generating after the initiation of said relative movement of said card and transducing means in said first direction.

11. In a magnetic record card transducing apparatus having a support and means for prepositioning a magnetic record card on said support, a first transducer operable to scan a record card prepositioned on said support by engagement therewith and effecting relative movement between said first transducer and a first track of the card in a first direction, a second transducer, a common mount supporting said first and second transducers, said second transducer being operable to scan said record card in a second direction after termination of scanning by said first transducer, the improvement comprising power operated means for projecting and retracting said first transducer to cause it to engage and disengage the surface of a card for effecting magnetic coupling and uncoupling with the recording surface of the card and control means for said power operated means operable to control the projection of said first transducer to engage the card while scanning said first track of the card in said first direction and to retract said first transducer while said second transducer scans a record card in said second direction.

12. A magnetic record card transducing apparatus in accordance with claim 11 wherein said common mount for said first and second transducers is pivotally supported, means pivoting said common mount with the transducers supported thereon in a manner such that when one is engagement with a card, the other is disengaged from said card and means for controlling said pivoting means to cause said first transducer to engage said first track while scanning in said first direction and to disengage the card when scanning is effected in said second direction and wherein said second transducer is brought into engagement with the card when relative movement is effected in said second direction.

* * * * *